United States Patent [19]

Cholod

[11] 4,436,893

[45] Mar. 13, 1984

[54] COPOLYESTER OF POLYETHYLENE TEREPHTHALATE AND SULFONYL DIPHENOL

[75] Inventor: Michael S. Cholod, Cornwells Heights, Pa.

[73] Assignee: Rohm and Haas Company, Philadelphia, Pa.

[21] Appl. No.: 436,228

[22] Filed: Oct. 25, 1982

[51] Int. Cl.$^3$ .................... C08G 63/18; C08G 63/68
[52] U.S. Cl. .................................. 528/173; 525/437
[58] Field of Search .................... 528/173; 525/437

[56] References Cited

U.S. PATENT DOCUMENTS

| | | | |
|---|---|---|---|
| 2,973,339 | 2/1961 | Muenster et al. | 528/173 |
| 4,145,517 | 3/1979 | Go | 528/173 |
| 4,163,100 | 7/1979 | Bier et al. | 528/173 |
| 4,188,357 | 2/1980 | Go | 528/173 |
| 4,307,060 | 12/1981 | Go | 528/173 |
| 4,330,661 | 5/1982 | Go | 528/173 |
| 4,384,106 | 5/1983 | Go et al. | 528/173 |

*Primary Examiner*—Lester L. Lee
*Attorney, Agent, or Firm*—Marc S. Adler

[57] ABSTRACT

A copolyester of polyethylene terephthalate and sulfonyl diphenol and a process for its preparation are provided. The copolyester has an instrinsic viscosity, glass transition temperature, and impact strength comparable to polyethylene terephthalate homopolymer but exhibits an increased crystallization time and is capable of being molded into clear articles. The process for preparing the copolyester comprises the steps of forming a polyethylene terephthalate prepolymer and polycondensing the prepolymer, preferably in the solid phase, with from about 2 to about 20 mole percent of sulfonyl diphenol in the presence of a suitable metallic catalyst system.

18 Claims, No Drawings

COPOLYESTER OF POLYETHYLENE TEREPHTHALATE AND SULFONYL DIPHENOL

BACKGROUND OF THE INVENTION

This invention relates to a copolyester of polyethylene terephthalate and a process for preparing the copolyester. The copolyester is useful in forming films and clear molded articles. More particularly, this invention relates to a copolyester of polyethylene terephthalate and sulfonyl diphenol having an increased crystallization time which provides the user of such copolyesters with more processing time to manufacture thicker films or molded articles, thereby avoiding premature crystallization and its attendant disadvantages.

Polyethylene terephthalate polymers can be either crystalline or non-crystalline solids. Crystalline polyethylene terephthalate (PET) is white and opaque, while the non-crystalline form is generally clear or transparent. When manufacturing a film the melted PET polymer may be extruded onto a casting roll, and if a molded article is to be manufactured, the PET polymer may be injected into a mold. Regardless of whether a film or molded article is being manufactured, the manufacturer desires to obtain the finished article substantially composed of transparent or clear PET to avoid the commercial disadvantage associated with a white, opaque film or article. It is known that when PET is heated to a semimolten state, above its crystalline melting point, PET is amorphous. Unless the polymer is quickly cooled, the film or molded article will tend to crystallize and the resulting product will have an opacity which is commercially unacceptable. The manufacturer is well aware of the fact that, when processing PET, he has only a limited amount of time, generally only about one minute, to solidify the film or molded article in the amorphous state before significant crystallization sets in.

DESCRIPTION OF THE PRIOR ART

PET polymers are conventionally produced in two steps. In the first step a prepolymer is formed. This is accomplished commercially in either of two ways. The prepolymer may be formed by the ester interchange reaction of ethylene glycol and dimethyl terephthalate or by the direct esterification reaction of ethylene glycol and terephthalic acid. Once the prepolymer is formed it is converted, in a second step, by a polycondensation reaction to a higher molecular weight polymer.

Since PET homopolymers crystallize too rapidly for molding into clear articles and result in opaque or colored products, copolymers of PET have been proposed. These copolymers have been formed using certain glycols instead of, or in addition to, ethylene glycol, or by using certain co-acids or their corresponding esters, in the prepolymer formation step. It has been found, however, that most of the common co-glycols and co-acids impart a lower glass transition temperature to the resulting polymer and reduce the resistance of the polymer to heat-induced embrittlement.

Attempts have been made to produce slow crystallizing PET copolymer by incorporating 5-20% of a co-glycol or co-acid. It has been found that, in order to increase the crystallization time enough to obtain a clear 0.2 inch thick molded part, a level of coglycol or co-acid must be used which causes the resulting PET copolymer to embrittle when held for short periods of time at temperatures below their glass transition temperature. If the level of the conventional co-acid or coglycol is reduced to the point where heat-induced embrittlement does not occur, then 0.2 inch thick parts molded from the resins will be very hazy or white (opaque) due to rapid crystallization.

It has also been found that the incorporation of diphenols, such as Bisphenol A(BPA), into the polymer can yield higher glass transition temperatures. However, it has been determined that diphenols typically react too slowly to be of commercial use in preparing PET copolymers (G. Bier, Polymer 15, p. 527 (1974); F. L. Hamb, J. Polymer Sci., 10, 3217 (1972) ). Copolyesters formed using typical diphenols are also usually highly colored and, as such, are commercially unacceptable (V. V. Korshak and S. V. Vinogradova, "Polyester", Pergamon Press, New York, (1965)).

Others in the field have unsuccessfully attempted to overcome the problems of rapid crystallization time, thermal stability, and color by various modifications to the prepolymer formation step, the polycondensation reaction step, and the catalysts utilized in the process.

Fiber forming terephthalate copolyesters having better water absorption and dyeability and a slightly decreased tendency toward crystallization are disclosed in U.S. Pat. No. 2,973,339 to Muenster et al. This patent discloses the use of certain co-glycols containing up to 30 mole percent of a glycol containing one or two benzene nuclei, for example, para-para'-di-(beta - hydroxy ethoxy) diphenyl sulfone (BSE) in the presence of conventional esterification catalysts such as zinc borate, zinc benzoate, zinc oxide, magnesium stearate, barium oxide or lead oxide in the prepolymer formation step. This patent does not, however, teach or suggest a method for producing clear molded articles having improved crystallization time.

U.S. Pat. No. 4,066,624 to Kawase et al teaches that stability and transparency can be improved while retarding crystallization speed by the ester interchange reaction of a naphthalene dicarboxylic acid and a 4,4'-bis(omega-hydroxy alkoxy) diphenyl sulfone (BSE) (glycol) and an aliphatic or alicyclic diol. The BSE (coglycol) was found to retard crystallization of naphthalene polyesters, however; it was necessary to use the BSE co-glycol jointly with a diol to prepare a high molecular weight polyester.

U.S. Pat. No. 4,188,357 to Go recognized that the glass transition temperature (Tg) of PET produced by direct esterification of terephthalic acid and ethylene glycol could be improved by adding a co-glycol, bis (4-betahydroxy ethoxy phenyl) sulfone (BSE) and a crosslinking agent, such as a trimellitic acid or its anhydride or lower alkyl ($C_1$-$C_4$) ester. The improvement in the melt strength of the resulting polymer was the result of crosslinking. The BSE co-glycol helped to lower the melting point and raise the glass transition temperature of the polymer and allowed for lower extrusion and blowing temperatures without premature crystallization. This patent is silent, however, regarding the degree of any increase in crystallization time achieved using BSE (coglycol) over that which would typically be expected by the addition of any coglycol. The addition of BSE was directed primarily towards improving the glass transition temperature of the PET and the invention resides in the addition of the trimellitic crosslinking agent to form molded articles.

U.S. Pat. No. 4,307,060 to Go disclosed new copolyesters particularly useful as extrusion-blow molded articles produced by the direct esterification reaction of terephthalic acid, ethylene glycol, bis (4- beta -hydroxy ethoxy phenyl) sulfone (BSE) co-glycol and a trifunctional crosslinking agent.

German Offenlegungsschrift 2,744,617 discloses a process for preparing thermoplastic aromatic polyesters. The polyesters are prepared by an interchange reaction of a phenyl ester of an aromatic dicarboxylic acid, i.e. diphenyl terephthalate, and at least 50 mole percent sulfonyl diphenol at elevated temperatures. Phenol is a by-product of the reaction. While the thermoplastic aromatic polyester possesses a lower melt viscosity, the process does not teach or suggest reducing the crystallization time of the aromatic polyester.

Other publications disclose the use of sulfonyl diphenol for preparing polyester fibers having higher shrinking and higher compatibility (Shima et al, Japanese Pat. Nos. 71,38614 and 71,34929). These publications do not teach or suggest the addition of sulfonyl diphenol to retard crystallization time and do not teach adding sulfonyl diphenol preferably during the polycondensation step. Ishigaki, Japanese Pat. No. 73,71496, discloses the use of polyols and dihydroxy compounds to prepare heat and chemically resistant polyesters for coatings. The Ishigaki reference teaches the addition of sulfonyl diphenol after the polyethylene terephthalate is formed in a post reaction step to improve the utility of the polyester for coatings. The coatings, however, have a commercially unacceptable yellow color. Crystallization time is not typically important in coating applications. Accordingly, these publications do not teach or suggest increasing the crystallization time of polyethylene terephthalate copolyesters which are capable of being molded into clear articles by the addition of sulfonyl diphenol.

U.S. Pat. No. 3,972,852 to Inata et al and U.S. Pat. No. 3,984,379 to Oka et al are directed to modifications in the polycondensation step. The '852 patent discloses a process for preparing aromatic polyesters in which the rate of the polycondensation reaction is increased. In this process an aromatic dicarboxylic acid or ester-forming derivative is reacted in the molten state with a diphenol. The polymer is further polymerized in the solid phase in the presence of at least one dihydroxy compound or carboxylic acid ester thereof. The diphenol compound must be used in a molar proportion of at least 70 percent relative to the dicarboxylic acid ester. The reaction is preferably conducted in the presence of a diaryl carbonate. This process is not, however, suitable for use with conventional PET manufacturing equipment. The Oka et al patent refers to general improvements in solid state polymerization of polyesters. The Oka et al patent teaches increasing the polycondensation reaction rate by using a suitable aromatic ortho-ester.

U.S. Pat. No. 3,652,499 to Borman discloses the preparation of solvent resistant polyesters. These polyesters are prepared by reacting 4,4'-sulfonyl diphenol with polybasic acids selected from the group of substituted and unsubstituted malonic, glutaric, and pimelic acids and their derivatives. This reaction is known as the acid chloride route and is not capable of being employed in conventional PET manufacturing equipment.

Other attempts have been made to improve the process for producing PET polymers having good clarity properties. My copending patent application, Ser. No. 345,859, incorporated herein by reference, discusses the prior art attempts at providing improved polycondensation catalyst systems and discloses and claims an improved catalyst system which reduces the polycondensation reaction time. This catalyst comprises from about 2 to about 18 parts per million, based on the polymer product, of a catalyst metal in the form of an alkyl titanate and from about 40 to about 300 parts per million of catalyst metal in the form of an antimony compound.

Thus, the art has recognized the problems of producing polyethylene terephthalate polymers or copolymers having the desired properties of increased crystallization time and clarity. However, none of the previous inventions have been able to accomplish the goal of producing PET polymers or copolymers capable of being molded into clear articles in conventional processing equipment without premature crystallization or without the parts becoming brittle when held at elevated temperatures below their glass transition temperatures for short periods of time.

It is an object of this invention, therefore, to provide a copolyester of polyethylene terephthalate and sulfonyl diphenol having an increased crystallization time.

Another object of this invention is to provide such a copolyester which is capable of being molded into clear articles and which has an impact strength and resistance to thermally induced embrittlement at least comparable to articles prepared from PET homopolymers.

It is a further object of this invention to provide a process for preparing such copolyesters.

Other objects and advantages will become apparent from the following description and claims.

SUMMARY OF THE INVENTION

Broadly, this invention contemplates a copolyester of polyethylene terephthalate and sulfonyl diphenol which can be molded into clear articles having an increased crystallization time and an instrinsic viscosity, glass transition temperature, resistance to thermally induced embrittlement, and impact strength comparable to polyethylene terephthalate.

The invention also contemplates a process for preparing the copolyester having an increased crystallization time comprising the steps of forming a polyethylene terephthalate prepolymer and polycondensing the prepolymer with from about 2 to about 20 mole percent of sulfonyl diphenol in the presence of a suitable amount of a polycondensation catalyst system.

DETAILED DESCRIPTION

The polyethylene terephthalate prepolymer may be formed by either an ester interchange reaction or by a direct esterification reaction.

If the prepolymer is to be prepared by the direct esterification of ethylene glycol and terephthalic acid, isophthalic acid, or other derivatives, the reaction is conducted under a pressure of 1 or 2 atmospheres and at a temperature of from about 220° C. to about 260° C. During the esterification reaction, water is distilled off. The reaction is considered complete when no further water is distilled off or the amount of water distilled off is about 90% to about 95% of the theoretical yield. The direct esterification reaction may be conducted without a catalyst; however, a catalyst is often used to increase the speed of the reaction, minimize the diethylene glycol content of the prepolymer, and improve the color of the prepolymer. Esterification catalysts such as zinc acetate, calcium acetate, titanium ethoxide, manganous acetate, antimony oxalate, and the like are well known in the art, and this invention is not to be construed as being limited to any particular direct esterification catalyst or to any particular process conditions for the direct esterification reaction for forming a PET prepolymer.

If the prepolymer is prepared by an ester interchange reaction, the reaction takes place between ethylene glycol and dimethyl terephthalate. The reaction is generally conducted under atmospheric pressure and at a temperature of from about 160° C. to about 225° C. During the reaction, methyl alcohol is distilled off as a by-product. The ester interchange reaction is considered complete when, at the temperature of about 160° C. to about 220° C., no further methanol is removed or the amount of methanol distilled off is about 90% to 95% of the theoretical yield.

The number of moles of ethylene glycol used in the prepolymer reaction for each mole of dimethyl terephthalate or terephthalic acid ranges from about 1.8 to about 2.2 moles of ethylene glycol per mole of dimethyl terephthalate. Preferably, the molar ratio will be from about 2 to 1. If less than 1.8 moles of ethylene glycol is used for each mole of dimethyl terephthalate or terephthalic acid, then the reaction will not efficiently proceed to completion. If an amount in excess of 2.2 moles of ethylene glycol is used for each mole of dimethyl terephthalate or terephthalic acid, then the excess ethylene glycol may result in a faster reaction rate. However, the economic disadvantage of using excess ethylene glycol may offset the faster reaction rate.

The ester interchange reaction requires the use of a catalyst. The amount of catalyst may vary widely, but typically the catalyst contains from about 20 parts to about 200 parts of metal per million parts of dimethyl terephthalate. Among the catalysts which may be used for the ester interchange reaction are manganous acetate, lithium acetate, sodium methylate, magnesium acetate, cobalt acetate, calcium acetate, cobalt dichloride, manganse acetate tetrahydrate, and the like.

Following the formation of the prepolymer, the prepolymer is further polymerized by a polycondensation reaction. This polycondensation reaction is conducted at a temperature of from about 265° C. to about 300° C. and at a subatmospheric pressure of about 1 torr or less in the presence of a polycondensation catalyst.

I have unexpectedly found that the addition of 4,4'-sulfonyl diphenol (i.e. bis (p-hydroxy phenyl) sulfone), isomers thereof, for example, 2,4'-sulfonyl diphenol, and mixtures thereof, to the prepolymer during the polycondensation step results in a copolyester having dramatically increased crystallization time, good thermal and mechanical properties, resistance to thermally induced embrittlement, and good color (clarity) without adversely affecting the polycondensation reaction time.

Diphenols typically are less reactive than glycols (G. Bier, Polymer 15, p. 527 (1974)) and therefore it would have been expected that the addition of a diphenol, such as sulfonyl diphenol, isomers, and mixtures thereof, to the polycondensation reaction of the prepolymer would have had an adverse affect on the rate of the reaction. In addition, it is well known from the prior art that other phenols, such as Bisphenol A, react too slowly to be useful and do not result in the formation of a high molecular weight product suitable for molding into clear articles.

I have found that, as the concentration of the sufonyl diphenol, isomers, and mixtures thereof is increased, the crystallization time of the final copolyester also increases. The concentration of the sulfonyl diphenol which I have found to be useful ranges from about 2 mole percent to about 20 mole percent of the copolyester. Above about 10 mole percent, however, I have found that the crystallization time, measured on the basis of the time it takes for half of the copolyester to crystallize, becomes greater than 1000 seconds. In addition, as the concentration of the sulfonyl diphenols in the copolyester increases to about 10 mole percent, the tendency of the copolyester to become brittle also increases. Accordingly, I have found that the preferred concentration of the sulfonyl diphenols is from about 2.5 mole percent to about 5 mole percent, with the concentration of about 2.5 mole percent to about 3.5 mole percent being the most preferred. This most preferred range of sulfonyl diphenol concentration results in a crystallization time of about four to about five minutes.

The sulfonyl diphenol is added during the polycondensation reaction step. If sulfonyl diphenol is added prior to the polycondensation step, the sulfonyl diphenol tends to deactivate the metallic catalyst used in the ester interchange prepolymer reaction step. This deactivation increases the time needed to complete the prepolymer reaction. Accordingly, sulfonyl diphenol is added once the prepolymer reaction is completed.

The polycondensation reaction is carried out in the presence of a polycondensation catalyst system. This catalyst system is also preferably added after the prepolymer formation step is completed. If the polycondensation catalyst is added during the prepolymer formation step, then the desired rapid polycondensation reaction rate may not be obtained. Examples of useful polycondensation reaction catalysts include compounds containing titanium, antimony, tin, germanium, and the like.

The preferred polycondensation catalyst is a combination or system including from about 2 parts to about 50 parts of a catalyst metal in the form of an alkyl titanate, per million parts of polymer product, and from about 40 parts to about 300 parts of another catalyst metal in the form of an antimony compound, per million parts of polymer product.

Any titanic acid derivative may be used, such as alkyl titanates, for example, titanium tetraisobutoxide, tetraisopropyl titanate, tetra-n-butyl-titanate, tetramethyl titanate, acetyl triisopropyl titanate, tetraisobutyl titanate, and the like. The preferred alkyl titanate is tetraisopropyl titanate.

The concentration of the alkyl titanate catalyst must be above 2 parts per million titanium, based on the weight of titanium metal to the weight of final copolyester product. Below 2 parts titanium per million parts of polymer product, the polycondensation reaction rate is insufficient to yield a copolyester in a practical amount of time. When the concentration of the alkyl titanate catalyst is above 50 parts by weight titanium per million parts of polymer product, the color of the final copolyester becomes unsatisfactory.

The antimony compounds which are useful in the catalyst system are antimony trioxide, antimony glucoxide, antimony butoxide, acetyl antimony dibutoxide, and the like. The preferred antimony compound is antimony trioxide, and the preferred concentration is from about 40 to about 150 parts of antimony metal per million parts of polymer product.

While it is possible to use the alkyl titanate separately, without the antimony compound, to catalyze the polycondensation reaction, the use of an alkyl titanate catalyst separately reduces the rate of the polycondensation reaction. It is also possible to catalyze the polycondensation reaction with the antimony compound separately, without the alkyl titanate, however, the crystallization time of the final product is not increased sufficiently and the final copolyester may have an unacceptable, greyish color. It is also possible to add the antimony compound during the prepolymer formation step; however, this is not preferable to its addition during the polycondensation reaction. The alkyl titanate catalyst must be added after the prepolymer reaction is completed.

A chain branching agent may also be present during the polycondensation reaction. This is often desirable to increase the melt viscosity of the copolyester. The chain branching agent may be present at any stage during the preparation of the copolyester. If a chain branching agent is present, the concentration of the chain branching agent is from about 0.1 mole percent to about 2 mole percent based on the number of moles of dimethyl terephthalate or terephthalic acid in the prepolymer formation step. Among the chain branching agents which may be used are pentaerythritol, dimethylol propionic acid, trimesic acid, and the like.

The polycondensation reaction is generally considered complete when the reaction product becomes sufficiently viscous. This may be readily determined from the amount of power that is required to drive the stirrer in the reaction kettle.

Following the polycondensation reaction, the copolyester has an intrinsic viscosity as measured in tetrachloroethane/phenol on the order of about 0.6 dl/g. This is typically too low an intrinsic viscosity for the manufacture of molded articles, thicker than about ⅛". Molded articles, thicker than about ⅛", require an intrinsic viscosity on the order of about 0.7 to about 0.75 dl/g. PET homopolymer useful for molded articles typically has an intrinsic viscosity of 0.72 dl/g. In order to increase the intrinsic viscosity and molecular weight of the copolyester of this invention, it is preferable to further polymerize the copolyester. This is done in the solid phase by heating the copolyester to a temperature above the glass transition temperature of the copolyester but below its melting point. This solid phase polymerization is conducted at a temperature of from about 200° C. to about 235° C. while passing a stream of inert gas over the copolyester or while holding the copolyester under vacuum for a period of from about 8 to about 14 hours.

The resulting copolyester has an intrinsic viscosity of at least about 0.72 dl/g.

When preparing the copolyester, the starting materials may include other acid-derived comonomers beside dimethyl terephthalate and/or terephthalic acid so that the final product will have up to 2% of repeating units other than those derived from dimethyl terephthalate or terephthalic acid. Other acid-derived comonomers which may be present in an amount of up to 2% include isophthalic acid, bi-benzoic acid, naphthalene 1,4,- or 2,6-dicarboxylic acid, adipic acid, sebacic acid and esters thereof, and the like.

It should be understood that, when the polyethylene terephthalate prepolymer is prepared by an ester interchange reaction, any other acid-derived comonomers which are included are all esters, and when the direct esterification route is used, all such other comonomers are acids.

One may also include other glycols besides ethylene glycol in an amount such that the final product will have from about 2% to about 4% of repeating units other than those derived from ethylene glycol. Among such other glycols may be neopentyl glycol, propylene glycol, butylene glycol, diethylene glycol, propane 1,3-diol, butane-1,4-diol, polytetramethylene glycol, 1,4-hydroxy methyl cyclohexane, and the like.

The copolyester may also include various additives such as antioxidant stabilizers, ultraviolet light screening agents, extrusion acids, dyes or pigments, mold release agents, and the like. Other suitable additives will be apparent to one skilled in the art. Whichever additive or additives are used, they must not adversely affect the copolyester when said copolyester is applied for its intended use.

In the examples which follow, the following test procedures were used.

Instrinsic viscosities are determined in a 60/40 phenol/symmetrical tetrachlorethane at 30° C.

Crystallization time is determined using a Perkin-Elmer DSC-II differential scanning calorimeter using the following procedure. Approximately 10 milligrams of dried copolyester is placed in the sample pan which is then placed in the calorimeter. The sample is heated to 573° K. and held at that temperature in order to melt the copolyester. After 120 seconds at 573° K., the sample is cooled at a rate of 160° K. per minute to a final temperature of 473° K. (200° C.). The exotherm is recorded and the crystallization time is taken as the time from the point that the recorder pen stabilizes on the base line to the time of maximum crystallization exotherm.

Penetration impact tests were run on a Dynatup Model 8200 tester (Effects Technology, Inc.). Specimens were prepared by injection molding 2"×3"×⅛" plaques. Heataged samples were held at 60° C. for 5 days. The type of failure (brittle or ductile) was determined by visual observation and by measuring the impact strength of the test sample.

In order to more fully illustrate the nature of this invention and the manner of practicing the same, the following examples are presented. In the Examples which follow, unless indicated to the contrary, all concentrations are shown as parts by weight.

GENERAL PROCEDURE

To a three-necked reaction vessel equipped with a stirrer, a condenser arranged for distillation, and a thermometer, is added 1000 parts of dimethyl terephthalate, 626 parts ethylene glycol, 0.07 parts of manganese as manganous acetate (70 parts per million of final product), and 0.02 parts cobalt as cobalt acetate (20 parts per million of final product). The reaction mixture is heated at a temperature of from 160° C. to 225° C. for a period of 97 minutes while removing 290 parts of methanol. Phosphorous acid (0.148 part) is then added as a stabilizer. The ester interchange prepolymer reaction is considered complete when 90 to 95% of the theoretical yield of methanol is removed or when no further methanol is removed. The polycondensation catalyst system is then added in the amounts set forth in the following table. The polycondensation catalyst system used is tetraisopropyl titanate and antimony trioxide. The sulfonyl diphenol is then added to the polycondensation reaction in the concentrations as set forth in the following tables. The pressure is reduced to less than 1 torr and the reaction temperature is increased to 280° C. to 290° C. to remove ethylene glycol by-product.

For comparison purposes, several examples are presented employing either alkyl titanate or an antimony compound separately as the polycondensation catalyst. Other comparative examples are presented where Bisphenol A is used instead of sulfonyl diphenol. The copolyester prepared using Bisphenol A has a molecular weight and intrinsic viscosity which is too low to prepare molded articles (IV << 0.62). Other examples provide the result of copolyesters formed with isomeric mixtures of sulfonyl diphenol.

glass transition temperature as compared with homopolymer and was brittle upon exposure to temperature (60° C. for 5 days). Examples 3 and 4 present copolyesters of the present invention prepared with 2.5 and 3.0 mole percent sulfonyl diphenol (SDP) during the polycondensation step. Molded articles produced therefrom were optically acceptable, ductile, and resistant to heat-induced embrittlement. The copolyester had a Tg comparable with the homopolymer (Example 1) and exhibited an increased crystallization time of 430 to 530 seconds (about 7 to 8 minutes), respectively. Copolyesters prepared with greater than 3.0 mole percent and less than about 5.0 mole percent sulfonyl diphenol isomers

TABLE I

| Example | Polycond. Cat. (PC) Type | Polycond. Cat. (PC) Conc.[1] | Copolymer Type | Copolymer Conc.[2] | Crystall. Time (sec) DSC at 200° C. | Clarity 0.2" thick molded article | Glass Trans. Temp. (Tg) DSC, °C. | Intrin. Vis. (IV) dl/g | Penetration Impact Test As Molded | Penetration Impact Test After 5 days, 60° C. |
|---|---|---|---|---|---|---|---|---|---|---|
| 1 | Sb/Ti | 100/10 | none | 0 | 60–80 | opaque | 82–84 | 0.72 | ductile | ductile |
| 2 | " | " | IPH[3] | 10 | 350–600 | clear | 75–80 | 0.62 | ductile | brittle |
| 3 | " | " | SDP | 2.5 | 430 | clear | 83–85 | 0.72 | ductile | ductile |
| 4 | " | " | SDP | 3.0 | 530 | clear | 83–85 | 0.72 | ductile | ductile |
| 5 | " | " | NPG[4] | 10 | >500 | clear | 80–85 | 0.72 | ductile | brittle |

[1]Conc. = Concentration (parts metal per million parts final product)
[2]Conc. = Concentration (mole percent)
[3]IPH = isophthalate - Added as dimethyl isophthalate during prepolymer step
[4]NPG = Neopentylglycol added during prepolymer step Table I presents the results of a comparative test of polyethylene terephthalate homopolymer (Example 1) and four copolyesters. Example 1 (homopolymer) results in an opaque 0.2 inch thick molded article which is ductile and resistant to heat-induced embrittlement. The crystallization time, however, was only 60–80 seconds at 200° C. Example 2 was prepared using 10 mole percent isophthalate, added during the prepolymer step as dimethyl isophthalate. While an 0.2 inch thick molded article prepared from this copolyester had an increased crystallization time and was clear, it exhibited a reduced and mixtures thereof also have an increased crystallization time over PET homopolymer, and an intrinsic viscosity, Tg, impact strength and resistance to thermal-induced embrittlement at least equivalent to PET homopolymer. Example 5 was prepared by adding 10 mole percent of neopentylglycol to the prepolymer step. While this coglycol increased the crystallization time and resulted in clear molded articles, the Tg was poorer than homopolymer (Example 1), and the penetration impact test showed that heat-induced embrittlement had occurred.

TABLE II

| Example | Polycond. Cat. (PC) Type | Polycond. Cat. (PC) Conc.[1] | Polycond. Copolymer Type | Polycond. Copolymer mole % | Crystall. Time (sec) at DSC*** 200° C. | Crystall. Time (sec) at DSC*** 180° C. | Intrin. Vis. (IV) dl/g | Clarity 0.2" Thick Molded Article |
|---|---|---|---|---|---|---|---|---|
| 6 | Sb | 240 | none | 0 | 30 | — | *** | opaque |
| 7 | Sb | 240 | none | 0 | 90 | — | 0.72 | opaque |
| 8 | Sb | 240 | SDP | 2.5 | 55 | — | *** | hazy clear |
| 9 | Sb/Ti | 100/12 | none | 0 | 60–65 | — | *** | opaque |
| 10 | Sb/Ti | 100/12 | SDP | 2.0 | 85 | — | *** | sl. haze |
| 11 | Sb/Ti | 100/12 | SDP | 2.5 | 295 | — | *** | clear |
| 12 | Sb/Ti | 100/12 | SDP | 2.5 | 430 | — | 0.72 | clear |
| 13 | Sb/Ti | 100/12 | SDP | 3.0 | 345 | — | *** | — |
| 14 | Sb/Ti | 100/12 | SDP | 3.0 | 530 | 213 | 0.71 | clear |
| 15 | Sb/Ti | 100/12 | SDP | 5.0 | * | — | *** | clear |
| 16 | Sb/Ti | 100/12 | SDP | 10.0 | * | — | *** | clear |
| 17 | Sb/Ti | 100/12 | SDP | 20.0 | * | — | *** | clear |
| 18 | Sb/Ti | 100/12 | DDS[2] | 3.0 | * | 222 | *** | clear |
| 19 | Sb/Ti | 100/12 | BPA[3] | 2.0 | ** | ** | <<0.62 | — |
| 20 | Sb/Ti | 100/12 | BPA | 10.0 | ** | ** | <<0.62 | — |
| 21 | Ti | 12 | none | 0 | 120 | — | *** | opaque |
| 22 | Ti | 12 | IPH[4] | 2.0 | 150 | — | *** | opaque |
| 23 | Ti | 12 | SDP | 3.0 | 480 | — | *** | — |
| 24 | Ti | 12 | SDP | 10.0 | * | — | *** | — |
| 25 | Ti | 12 | DDS | 300 | * | — | *** | — |
| 26 | Ti | 30 | none | 0 | 135 | — | *** | — |
| 27 | Ti | 30 | SDP | 3.0 | 255 | — | *** | — |
| 28 | Ti | 50 | SDP | 3.0 | 330 | — | *** | — |
| 29 | Sb/Ti | 200/12 | SDP | 3.0 | 45 | — | *** | — |
| 30 | Sb | 240 | SDP | 10.0 | * | — | *** | — |
| 31 | Sb | 240 | DDS | 3.0 | 15 | — | *** | — |
| 32 | Sb/Ti | 300/10 | SDP | 2.0 | 41 | — | *** | — |

TABLE II-continued

| Example | Polycond. Cat. (PC) Type | Conc.[1] | Polycond. Copolymer Type | mole % | Crystall. Time (sec) at DSC[***] 200° C. | 180° C. | Intrin. Vis. (IV) dl/g | Clarity 0.2" Thick Molded Article |
|---|---|---|---|---|---|---|---|---|
| 33 | Sn | 80 | SDP | 3.0 | [*] | — | [°**] | — |

[1]Conc. = Concentration (parts metal per million parts final product)
[2]DDS = SDP with 10–15 mole % of 2,4' hydroxy phenyl sulfone isomer
[3]BPA = Bisphenol A
[4]IPH = Isophthalate
[°]Greater than 1000 seconds
[**]No high molecular weight product formed
[***]Crystallization time was determimned at an IV of 0.62 dl/g unless otherwise specified.

Table II (Examples 6–33) presents a comparison of the copolyesters of this invention prepared with varying concentrations of catalysts and copolymers. Examples 6–8 show that, when antimony (240 ppm) catalyst alone is used, the crystallization time of a copolyester prepared using 2.5 mole % SDP results in only a slight increase in crystallization time and results in a hazy molded article. Examples 9–20 were prepared with the preferred combined Sb/Ti catalyst (100/12) system and with various concentrations of SDP and DDS (mixture of sulfonyl diphenol and 10–5 mole % of the 2,4' isomer). Examples 9–17 show that, as the concentration of SDP increases, the crystallization time also increases. At 5.0 mole % SDP concentration and above, the crystallization time becomes too long to be measured (greater than 1000 seconds). Examples 18–20 show that DDS also improves the crystallization time, while Examples 19 and 20 show that Bisphenol A does not result in a high molecular weight product with an acceptable intrinsic viscosity for preparing molded articles. The reaction to form a copolyester with BPA was also very slow as compared with SDP and DDS. Examples 21–28 present the results of copolyesters prepared using a titanium-containing catalyst only. The copolyester of Example 24 (3.0 mole % SDP) showed an improved crystallization time as compared with Examples 13 and 14 using the same concentration of SDP with a combined Sb/Ti catalyst system. Examples 30–32 present the results of copolyesters prepared using higher concentrations of antimony catalyst alone and in combination with titanium. Increasing the antimony content in the combined catalyst (Examples 29 and 32) actually reduced the crystallization time instead of increasing it (see Examples 13 and 14). Increasing the concentration of antimony in the antimony only catalyst (Examples 30 and 31) did not improve the crystallization time over combinations of catalyst systems with lower antimony contents and with 12 ppm titanium (see Examples 16 and 18). Example 33 presents the results of the copolyester formed using a tin-containing catalyst with 3.0 mole % of SDP. The copolyester had an increased crystallization time compared with titanium catalyst only (Example 23) and combined antimony and titanium (Example 13) at the same SDP concentration.

The crystallization time of copolyesters containing sulfonyl diphenol, isomers, and mixtures thereof, prepared in the presence of polycondensaton catalyst systems containing a catalyst metal in the form of an alkyl titanate, an antimony compound, or a tin compound only or a combination of antimony and titanium containing 200 or 300 parts antimony compound per million parts of polymer product and 10 or 12 parts alkyl titanate per million parts of polymer product respectively, as illustrated in Examples 23, 24, 25, 27, 28, 30 and 33 also would be expected to result in the formation of clear 0.2 inch molded parts because of the increase in the crystallization time achieved.

What is claimed is:

1. A copolyester of polyethylene terephthalate capable of being molded into clear articles comprising from about 2 to about 20 mole percent sulfonyl diphenol, isomers and mixtures thereof, and from about 98 to about 80 mole percent ethylene terephthalate prepolymer.

2. The copolyester of claim 1 where said sulfonyl diphenol, isomers and mixtures thereof further comprise from about 2.5 to about 5 mole percent sulfonyl diphenol, isomers and mixtures thereof.

3. The copolyester of claim 1 where said units derived from sulfonyl diphenol or isomers and mixtures thereof further comprise from about 2.5 to about 3.5 mole percent sulfonyl diphenol or isomers and mixtures thereof.

4. The copolyester of claims 1 or 2 having a crystallization time at 200° C. greater than polyethylene terephthalate homopolymer.

5. The copolyester of claim 3 wherein the crystallization time at 200° C. is at least about five minutes.

6. The copolyester of claim 2 having an intrinsic viscosity, glass transition temperature, impact strength and resistance to thermal-induced embrittlement at least equivalent to polyethylene terephthalate homopolymer.

7. The copolyester of claim 6 having an intrinsic viscosity of about 0.72 and a glass transition temperature of about 83° C. to about 85° C.

8. A process for preparing the copolyester of claim 1 comprising forming a prepolymer of polyethylene terephthalate by an ester interchange or a direct esterification reaction, and polycondensing the prepolymer in the presence of said sulfonyl diphenol or isomers and mixtures thereof and a catalyst system comprising antimony and titanium compounds, wherein said sulfonyl diphenol or isomers and mixtures thereof are added during said polycondensation step.

9. The process of claim 8 wherein the prepolymer of polyethylene terephthalate is prepared by an ester interchange reaction of ethylene glycol and dimethyl terephthalate.

10. A process for preparing a copolyester of polyethylene terephthalate having a crystallization time greater than polyethylene terephthalate and capable of being molded into clear articles comprising:
(1) preparing a polyethylene terephthalate prepolymer by the ester interchange reaction of ethylene glycol and dimethyl terephthalate;
(2) polycondensing said prepolymer in the presence of from about 2 mole percent to about 20 mole percent of sulfonyl diphenol or isomers and mixtures thereof and a suitable amount of a catalyst system; and (3) polymerizing the polycondensed copolyester in the solid phase at a temperature above the glass transition temperature of the copolyester and below its melting point until said copolyester has an intrinsic viscosity of at least about 0.72 dl/g.

11. The process of claim 10 wherein said catalyst system comprises at least 2 parts and less than about 50 parts of titanium metal in the form of an alkyl titanate per million parts of said final copolyester.

12. The process of claim 11 wherein said catalyst system additionally comprises from 40 parts to 300 parts of an antimony metal in the form of an antimony compound per million parts of said final copolyester.

13. The process of claim 10 wherein the concentration of said sulfonyl diphenols is from about 2.5 to about 5 mole percent.

14. The process of claim 10 wherein said catalyst system comprises a tin compound.

15. A copolyester of polyethylene terephthalate capable of being molded into clear articles, said copolyester exhibiting a crystallization time greater than polyethylene terephthalate homopolymer and having an intrinsic viscosity, glass transition temperature, impact strength, and resistance to thermal induced embrittlement at least equivalent to polyethylene terephthalate homopolymer, comprising 97.0 mole percent polyethylene terephthalate and 3.0 mole percent of a crystallization-reducing comonomer selected from the group consisting of sulfonyl diphenol, isomers of sulfonyl diphenol, and mixtures of sulfonyl diphenol and isomers thereof.

16. The copolyester of claim 15 prepared by forming a prepolymer of polyethylene terephthalate by an ester interchange reaction of ethylene glycol and dimethyl terephthalate, polycondensing the prepolymer in the presence of said crystallization-reducing comonomer and a catalyst comprising 12 parts titanium per million parts of the final copolyester.

17. The copolyester of claim 16 where said titanium in said catalyst is in the form of an alkyl titanate selected from the group consisting of titanium tetra-isobutoxide, tetra-isopropyltitanate, acetyl tri-isopropyl titanate, and tetra-isobutyl titanate.

18. A clear molded article having a thickness of at least one-fifth inch comprising from about 98 to about 80 mole percent polyethylene terephthalate and from about 2 to about 20 mole percent of a crystallization-reducing comonomer selected from the group consisting of sulfonyl diphenol, isomers of sulfonyl diphenol, and mixtures of sulfonyl diphenol and isomers thereof.

* * * * *

UNITED STATES PATENT AND TRADEMARK OFFICE
CERTIFICATE OF CORRECTION

PATENT NO. : 4,436,893
DATED : March 13, 1984
INVENTOR(S) : MICHAEL S. CHOLOD

It is certified that error appears in the above-identified patent and that said Letters Patent is hereby corrected as shown below:

Column 10, table II,

Example 25 under Mole % "300" should be --3.0--

Signed and Sealed this

Nineteenth Day of June 1984

[SEAL]

Attest:

GERALD J. MOSSINGHOFF

*Attesting Officer*     *Commissioner of Patents and Trademarks*